(12) United States Patent
Hirosawa

(10) Patent No.: US 9,146,434 B2
(45) Date of Patent: Sep. 29, 2015

(54) LIQUID CRYSTAL DISPLAY DEVICE HAVING PARTICULAR ELECTRODES STRUCTURE

(71) Applicant: Japan Display Inc., Minato-ku (JP)

(72) Inventor: Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 136 days.

(21) Appl. No.: 14/063,502

(22) Filed: Oct. 25, 2013

(65) Prior Publication Data
US 2014/0118651 A1    May 1, 2014

(30) Foreign Application Priority Data

Oct. 30, 2012 (JP) ................................ 2012-239401

(51) Int. Cl.
G02F 1/136     (2006.01)
G02F 1/1343    (2006.01)
G02F 1/1362    (2006.01)

(52) U.S. Cl.
CPC .... G02F 1/136286 (2013.01); G02F 1/134309 (2013.01); G02F 1/136213 (2013.01); G02F 2001/134318 (2013.01)

(58) Field of Classification Search
CPC ............ G02F 1/1368; G02F 1/136227; G02F 1/136286; G02F 1/133707; G02F 1/134336; G02F 1/1393; H01N 27/1214; H01N 27/12
USPC .................... 349/43, 139, 143, 146
See application file for complete search history.

(56) References Cited

U.S. PATENT DOCUMENTS

| 6,266,116 | B1 | 7/2001 | Ohta et al. |
| 2001/0010575 | A1 | 8/2001 | Yoshida et al. |
| 2004/0165136 | A1 | 8/2004 | Sugiyama et al. |
| 2005/0206824 | A1 | 9/2005 | Son et al. |
| 2005/0219453 | A1 | 10/2005 | Kubo et al. |

(Continued)

FOREIGN PATENT DOCUMENTS

| JP | 6-222397 | 8/1994 |
| JP | 7-159807 | 6/1995 |

(Continued)

OTHER PUBLICATIONS

U.S. Appl. No. 14/469,967, filed Aug. 27, 2014, Hirosawa.

*Primary Examiner* — Mike Qi
(74) *Attorney, Agent, or Firm* — Oblon, McClelland, Maier & Neustadt, L.L.P.

(57) ABSTRACT

A first substrate includes a first interlayer insulating film covering a switching element. A first main-common electrode is formed on the first interlayer insulating film. The first main-common electrode extends along a source line. A second interlayer insulating film covers the first main-common electrode. A second main-common electrode is formed on the second inter insulating film and extends so as to face the source line. The second main-common electrode is set to the same potential as the first main-common electrode. A main-pixel electrode connected with the switching element is formed on the second interlayer insulating film. A second substrate includes a third main-common electrode so as to face the second main-common electrode. The third main-common electrode is set to the same potential as the second main-common electrode.

11 Claims, 7 Drawing Sheets

(56) References Cited

U.S. PATENT DOCUMENTS

| | | |
|---|---|---|
| 2007/0115234 A1 | 5/2007 | Kim et al. |
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1 | 8/2008 | Kwon et al. |
| 2013/0093983 A1* | 4/2013 | Kizu et al. ............. 349/96 |
| 2013/0314637 A1 | 11/2013 | Hirosawa |
| 2013/0321727 A1 | 12/2013 | Morita et al. |
| 2013/0329156 A1 | 12/2013 | Hirosawa |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |

* cited by examiner

LIQUID CRYSTAL DISPLAY DEVICE HAVING PARTICULAR ELECTRODES STRUCTURE

CROSS-REFERENCE TO RELATED APPLICATION

This application is based upon and claims the benefit of priority from prior Japanese Patent Application No. 2012-239401 filed Oct. 30, 2012, the entire contents of which are incorporated herein by reference.

FIELD

Embodiments described herein relate generally to a liquid crystal display device.

BACKGROUND

In recent years, a flat panel display device is developed briskly. Especially, the liquid crystal display device gets a lot of attention from advantages, such as light weight, thin shape, and low power consumption. In an active matrix type liquid crystal display device equipped with a switching element in each pixel, a structure using lateral electric field, such as IPS (In-Plane Switching) mode and FFS (Fringe Field Switching) mode, attracts attention.

The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate. As one example, a portion of the pixel electrode covers a gate line and shields electric field from the gate line.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
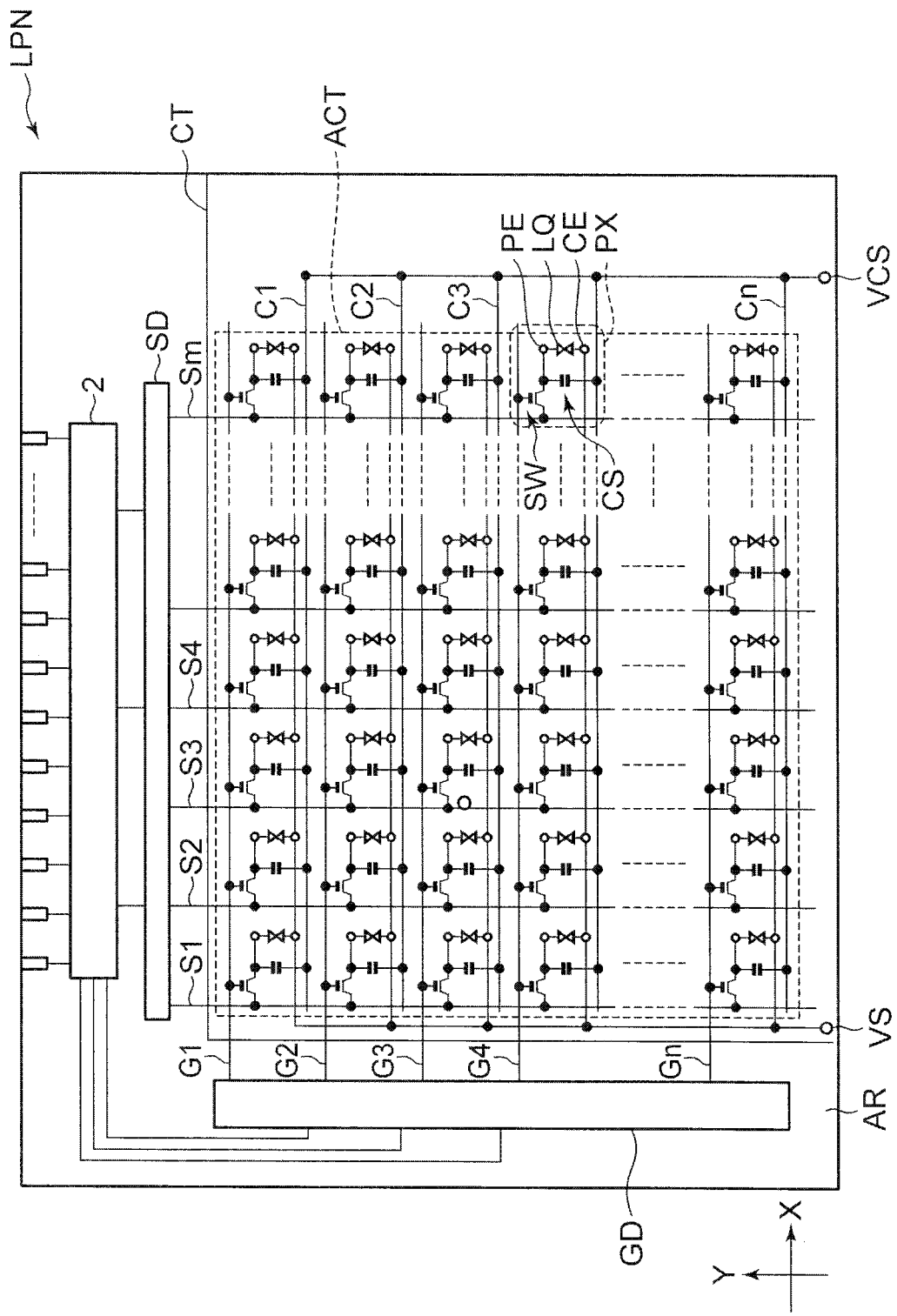
FIG. 1 is a figure schematically showing a structure and an equivalent circuit of a liquid crystal display device according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a gate line extending in a first direction, a source line extending in a second direction orthogonally crossing the first direction, a switching element electrically connected with the gate line and the source line, a first interlayer insulating film covering the switching element, a sub-common electrode formed on the first interlayer insulating film and extending in the first direction, the sub-common electrode facing the gate line, a first main-common electrode formed on the first interlayer insulating film and connected with the sub-common electrode, the first main-common electrode extending along the source line in the second direction, a second interlayer insulating film covering the sub-common electrode and the first main-common electrode, a second main-common electrode formed on the second inter insulating film and extending in the second direction so as to face the source line, the second main-common electrode set to the same potential as the first main-common electrode, a main-pixel electrode formed on the second interlayer insulating film and extending in the second direction so as to cross the sub-common electrode, the main-pixel electrode electrically connected with the switching element, and a first alignment film covering the second main-common electrode and the main-pixel electrode; a second substrate including; a third main-common electrode extending in the second direction so as to face the second main-common electrode, the third main-common electrode set to the same potential as the second main-common electrode, and a second alignment film covering the third main-common electrode, a liquid crystal layer held between the first substrate and the second substrate.

According to other embodiment, a liquid crystal display device, includes: a first substrate including; a gate line extending in a first direction, a source line extending in a second direction orthogonally crossing the first direction, a switching element electrically connected with the gate line and the source line, a gate shield electrode extending in the first direction and facing the gate line, a source shield electrode extending in the second direction so as to face the source line, the source shield electrode set to the same potential as the gate shield electrode, and a main pixel electrode extending in the second direction so as to cross the gate shield electrode, the main pixel electrode being apart from the source shield electrode and electrically connected with the switching element, a second substrate including a main-common electrode facing the source shield electrode and extending in the second direction, the main-common electrode set to the same potential as the source shield electrode; and a liquid crystal layer held between the first substrate and the second substrate.

FIG. 1 is a figure schematically showing a structure and the equivalent circuit of a liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN includes an active area ACT which displays images. The active area ACT is formed of a plurality of pixels PX arranged in the shape of a (m×n) matrix (here, "m" and "n" are positive integers).

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C linearly extend in a first direction X, respectively. The gate line G and the auxiliary capacitance line C are arranged in turns along a second direction Y that orthogonally intersects the first direction X. The source lines S cross the gate line G and the capacitance line C. The source lines S extend linearly in the second direction Y, respectively. The gate line G, the auxiliary capacitance line C and the source lines S may not necessarily extend linearly, and a portion thereof may be crooked partly.

Each gate line G is pulled out to outside of the active area ACT, and connected to a gate driver GD. Each source line S is pulled out to the outside of the active area ACT, and connected to a source driver SD. At least a portion of the gate driver GD and the source driver SD is formed in the array substrate AR, for example. The gate driver GD and the source driver SD are connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which auxiliary capacitance voltage is impressed.

The switching element SW is formed of an n channel type thin film transistor (TFT), for example. The switching element SW is electrically connected with the gate line G and the source line S. The (m×n) switching elements SW are formed in the active area ACT. The switching element SW may be either a top-gate type or a bottom-gate type. Though the semiconductor layer is formed of poly-silicon, the semiconductor layer may be formed of amorphous silicon.

The pixel electrode PE is arranged in each pixel PX and electrically connected with the switching element SW. The common electrode CE of common potential is arranged in common to the plurality of pixel electrodes PE through the liquid crystal layer LQ. An electric power supply portion VS is formed outside of the active area ACT to impress a voltage to the common electrode CE. Furthermore, the common electrode CE is drawn to outside of the active area ACT and electrically connected with the electric power supply portion VS through an electric conductive component which is not illustrated.

In addition, in the liquid crystal display panel LPN according to this embodiment, while the pixel electrode PE is formed in the array substrate AR, at least one portion of the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is an oblique electric field slightly oblique with respect to a X-Y plane specified by the first direction X and the second direction Y, i.e., the substrates (or lateral electric field substantially in parallel with the principal surface of the array substrate AR.)

Figure 2:
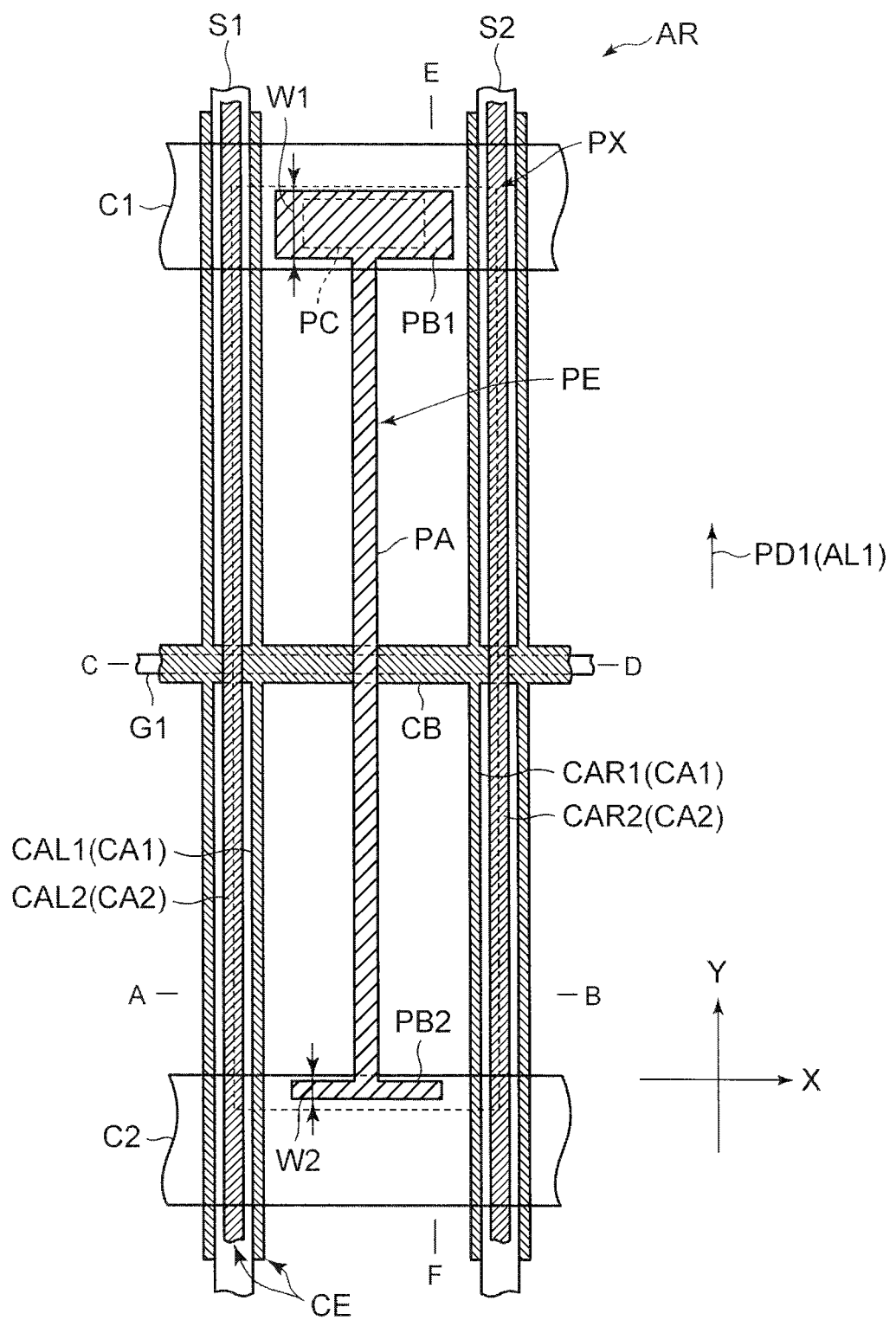
FIG. 2 is a plan view schematically showing a structure of one pixel when an array substrate AR shown in FIG. 1 is seen from a counter substrate side according to the embodiment.

FIG. 2 is a plan view schematically showing a structure of one pixel when an array substrate AR shown in FIG. 1 is seen from a counter substrate side according to the embodiment.

The array substrate AR is equipped with a gate line G1, an auxiliary capacitance line C1, an auxiliary capacitance line C2, a source line S1, a source line 82, a pixel electrode PE, and a portion of a common electrode CE, a first alignment film AL1, etc. The array substrate AR is also equipped with a switching element SW though not shown.

The auxiliary capacitance line C1 and the auxiliary capacitance line C2 are arranged at intervals along the second direction Y, and extend in the first direction X, respectively. The gate line G1 is located between the auxiliary capacitance line C1 and the auxiliary capacitance line C2, and extend along the first direction X. In this embodiment, the gate line G1 is located in an approximately center between the auxiliary capacitance line C1 and the auxiliary capacitance line C2. That is, the interval between the gate line G1 and the auxiliary capacitance line C1 in the second direction Y is approximately the same as the interval between the gate line G1 and the auxiliary capacitance line C2 in the second direction Y. The source line S1 and the source line S2 are arranged at intervals along the first direction X, and extend in the second direction Y, respectively. The pixel electrode PE is arranged between the adjoining source line S1 and the source line S2.

In this embodiment, the pixel PX corresponds to a square region surrounded with the auxiliary capacitance lines C1 and C2 and the source lines S1 and S2, and is formed in the shape of a rectangle whose length in the first direction X is shorter than the length in the second direction Y, as shown with a dashed line in FIG. 2. The length in the first direction X of the pixel PX corresponds to a pitch between the source line S1 and the source line S2 in the first direction X, and the length in the second direction Y of the pixel PX corresponds to a pitch between the auxiliary capacitance C1 and the auxiliary capacitance line C2 in the second direction Y.

In the illustrated pixel PX, the source line S1 is arranged at the left-hand side end in the pixel PX. Precisely, the source line S1 is arranged striding over a boundary between the illustrated pixel PX and a pixel adjoining the illustrated pixel PX on the left-hand side. The source line S2 is arranged at the right-hand side end. Similarly, the source line S2 is arranged striding over a boundary between the illustrated pixel PX and a pixel adjoining the illustrated pixel PX on the right-hand side. Moreover, in the pixel PX, the auxiliary capacitance line C1 is arranged in an upper end portion. Precisely, the auxiliary capacitance line C1 is arranged striding over a boundary between the illustrated pixel PX and a pixel adjoining the illustrated pixel PX on its upper end side. The auxiliary capacitance line C2 is arranged in a lower end portion. Precisely, the auxiliary capacitance line C2 is arranged striding over a boundary between the illustrated pixel PX and a pixel adjoining the illustrated pixel PX on its lower end side. The gate line G1 is arranged approximately in a central portion of the pixel PX.

The switching element which is not illustrated is electrically connected with the gate line G1 and the source line S1, and arranged near an intersection between the gate line G1 and the source line S1. A contact portion PC is electrically connected with the switching element. The contact portion PC is located on the side facing the gate line G1 in a region which overlaps with the auxiliary capacitance line C1.

The pixel electrode PE is electrically connected with the contact portion PC in the position which overlaps with the auxiliary capacitance line C1. The pixel electrode PE is equipped with a main pixel electrode PA, a first sub-pixel electrode PB1, and a second sub-pixel electrode PB2. The main pixel electrodes PA, the first sub-pixel electrode PB1, and the second sub-pixel electrode PB2 are formed integrally or continuously, and electrically connected mutually.

The main pixel electrode PA is located between the source line S1 and the source line S2, and linearly extends along the second direction Y to near an upper end and a bottom end of the pixel PX. In this embodiment, the main pixel electrode PA is located in an approximately center between the source line S1 and the source line S2. That is the interval between the source line S1 and the main pixel electrode PA in the first direction X is approximately the same as the interval between the source line 82 and the main pixel electrode PA. The main pixel electrode PA is formed in a belt shape with substantially the same width along the first direction X.

The first sub-pixel electrode PB1 lineally extends between the source line S1 and the source line S2 along the first direction X. The first sub-pixel electrode PB1 is connected with an end portion of the main pixel electrode PA, and located on the side facing the gate line G1 in the region which overlaps with the auxiliary capacitance line C1. Moreover, at leas a portion of the first sub-pixel electrode PB1 overlaps with the contact portion PC, and is in contact with contact portion PC. The first sub-pixel electrode PB1 is formed in a belt shape with substantially the same width W1 along the second direction Y.

The second sub-pixel electrode PB2 lineally extends between the source line S1 and the source line S2 along the first direction X. The second sub-pixel electrode PB2 is connected with the other end portion of the main pixel electrode PA, and located on the side facing the gate line G1 in the region which overlaps with the auxiliary capacitance line C2. The second sub-pixel electrode PB2 is formed in a belt shape with substantially the same width W2 along the second direction Y.

Although not illustrated, one auxiliary capacitance line is arranged striding over two pixels which adjoin in the second direction Y. The first sub-pixel electrode PB1 of the pixel electrode of one pixel and the second sub-pixel electrode PB2 of the pixel electrode of the adjacent pixel are arranged at intervals in the region which overlaps with the auxiliary capacitance line. While the first sub-pixel electrode PB1 is formed broadly to secure an area required for contacting with the contact portion PC, the second sub-pixel electrode PB2 may function as an electrode for forming electric field. For this reason, the width W1 of the first sub-pixel electrode PB1 is larger than the width W2 of the second sub-pixel electrode PB2.

The common electrode CE is equipped with a first main-common electrode CA1, a second main-common electrode CA2, and a sub-common electrode CB. The first main-common electrode CA1 and the sub-common electrode CB are integrally or continuously formed, and electrically connected mutually. While the second main common electrode CA2 is arranged apart from the first main common electrode CA1, etc., the second main common electrode CA2 and the first main common electrode CA1 are electrically connected mutually. That is, the first main common electrode CA1 and the second main common electrode CA2 are connected with an electric power supply portion VS on outside of the active area ACT, and set to the same potential each other.

The first main-common electrode CA1 extends along the source line S. The first main-common electrode CA1 is located on the both sides sandwiching the main pixel electrode PA in the X-Y plane, and linearly extends along the second direction Y. The first main-common electrode CA1 is arranged on the pixel electrode PE side rather than the position which overlaps with the source line S. The first main-common electrode CA1 is formed in a belt shape with the same width along the first direction X.

In this embodiment, the first main-common electrode CA1 is arranged in two parallel lines in the first direction X, and is equipped with a first main-common electrode CAR1 located in the left-hand side end, and a first main-common electrode CAR1 located in the right-hand side end of the pixel PX. While the first main-common electrode CAL1 extends along the source line S1 and is arranged on the pixel electrode PE side rather than the position which overlaps with the source line S1, a portion thereof may be arranged overlapping with the source line S1. Similarly, while the first main-common electrode CAR1 extends along the source line S2 and is arranged on the pixel electrode PE side rather than the position which overlaps with the source line S2, a portion thereof may be arranged overlapping with the source line S2.

The sub-common electrode CB extends along the gate line G1. That is, the sub-common electrode CB linearly extends along the first direction X in the X-Y plane. The sub-common electrode CB counters with the gate line G1. The sub-common electrode CB is formed in a belt shape. The electrode width of the sub-common electrode CB in the second direction Y is larger than the width of the gate line G1 in the second direction Y, for example. That is, the sub-common electrode CB is arranged in the position which overlaps with the gate line G1. The sub-pixel electrode CB is connected with the first main-common electrode CA1.

The second main-common electrode CA2 counters the source line S. That is, the second main-common electrode CA2 is located on the both sides sandwiching the main pixel electrode PA in the X-Y plane, and linearly extends along the second direction Y. The second main-common electrode CA2 extends substantially in parallel to the first main-common electrode CA1. The second main-common electrode CA2 is formed in the shape of a belt with a smaller width than the width of the source line S and substantially the same width along the first direction X.

In this embodiment, the second main-common electrode CAL2 is arranged in two parallel lines at intervals in the first direction X, and includes a second main-common electrode CAL2 located on the left-hand side of the pixel PX and arranged striding over a boundary between the illustrated pixel PX and a pixel adjoining the illustrated pixel PX on the left-hand side, and a second main-common electrode CAR2 located on the right-hand side of the pixel PX and arranged striding over a boundary between the illustrated pixel PX and a pixel adjoining the illustrated pixel PX on the right-hand side. The second main-common electrode CAL2 extends along the first main-common electrode CAL1 with a smaller width than the width of the source line S1, and is arranged in a location overlapping the source line S1. The second main-common electrode CAL2 crosses the sub-pixel electrode CB on the source line S1. Further, the second main-common electrode CAR2 extends along the first main-common electrode CAR1 with a smaller width than the width of the source line S2, and is arranged in a location overlapping the source line S2 so as to cross the sub-pixel electrode CB on the source line S2.

In the array substrate AR, the pixel electrode PE and the second main-common electrode CA2 are covered with the first alignment film AL1. Alignment treatment is carried out to the first alignment film AL1 along with an alignment treatment direction PD1 to initially align liquid crystal molecules of the liquid crystal layer LQ. The alignment treatment direction PD1 is substantially in parallel to the second direction Y, for example.

Figure 3:
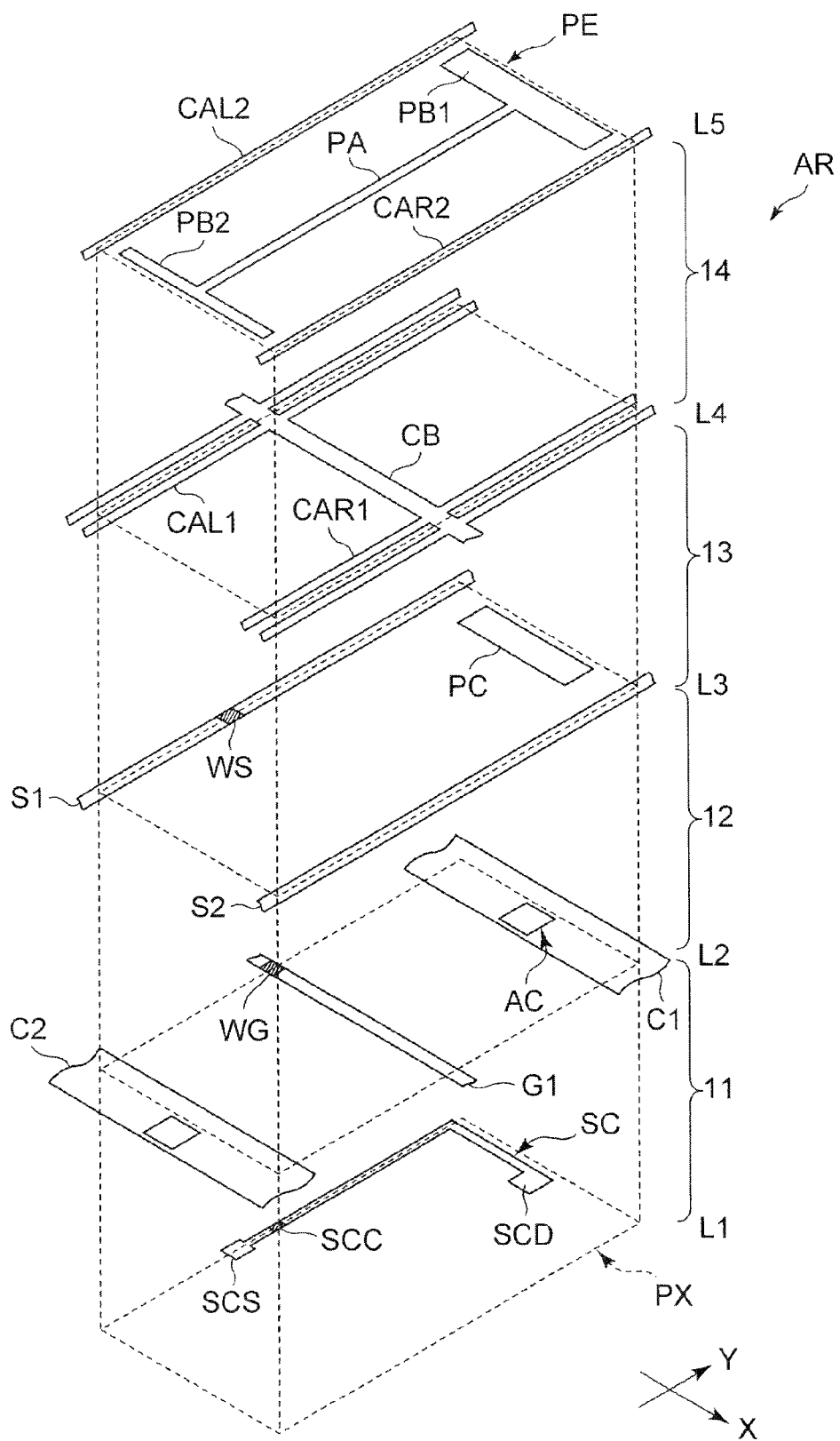
FIG. 3 is an exploded perspective view schematically showing a main layer structure forming the array substrate AR.

FIG. 3 is an exploded perspective view schematically showing a main layer structure forming the array substrate AR. In addition, the main electric conductive layers in the array substrate AR are illustrated here.

A first insulating film 11 is interposed between a first layer L1 and a second layer L2, a second insulating film 12 is interposed between the second layer L2 and a third layer L3, a third insulating film 13 is interposed between the third layer L3 and a fourth layer L4, and a fourth insulating film 14 is interposed between the four layer L4 and a fifth layer L5.

In the first layer L1, a semiconductor layer SC of the switching element is formed. For example, the semiconductor layer SC is formed with poly-silicon. The semiconductor layer SC extends under the source line S1 to an under portion of the auxiliary capacitance line C1 intersecting the gate line G1. A region of the semiconductor layer SC located under the gate line G1 forms a channel region SCC, a region of the semiconductor layer SC on the side in which the semiconductor layer SC contacts with the source line S1 forms a source region SCS, and a region of the semiconductor layer SC extending to the under portion of the auxiliary capacitance line C1 from the channel region SCC forms a drain region SCD.

In the second layer L2, the auxiliary capacitance line C1, the gate line G1, and the auxiliary capacitance line C2 are arranged. The auxiliary capacitance line C1 is located above the drain region SCD. An aperture portion AC is formed in the auxiliary capacitance line C1 corresponding to the drain region SCD. In the gate line G1, a region located above the semiconductor layer SC corresponds to a gate electrode WG of the switching element.

In the third layer L3, the source line S1, the source line S2, and the contact portion PC are arranged. The source line S1 is located above a portion of the semiconductor layer. In the source line S1, a region which contacts the semiconductor layer SC corresponds to a source electrode WS of the switching element. That is, the source electrode WS is in contact with the source region SCS through a contact hole which penetrates the first insulating film 11 and the second insulating film 12. The contact portion PC is located above the auxiliary capacitance line C1. The contact portion PC corresponds to a drain electrode of the switching element. That is, the contact portion PC is in contact with the drain region SCD through a contact portion which penetrates the first insulating film 11 and the second insulating film 12, and the aperture portion AC.

In the fourth layer L4, the first main-common electrode CAL1, the first main-common electrode CAR1, and the sub-common electrode CB are arranged. The first main-common electrode CAL1 is located on an inner side of the pixel PX rather than above the source line S1. The first main-common electrode CAR1 is located on the inner side of the pixel PX rather than above the source line S2. The sub-common electrode CB is located above the gate line G1.

In the fifth layer L5, the second main-common electrode CAL2, the second main-common electrode CAR2, and the pixel electrode PE are arranged. The second main-common electrode CAL2 is located above the source line S1. The second main-common electrode CAR2 is located above the source line S2. The main pixel electrode PA of the pixel electrode PE intersects the sub-common electrode CB in two levels through the fourth insulating film 14. The first sub-pixel electrode PB1 is located above the contact portion PC, and in contact with the contact portion EC through a contact hole which penetrates the third insulating film 13 and the fourth insulating film 14. The second sub-pixel electrode PB2 is located above the auxiliary capacitance line C2.

Figure 4A:
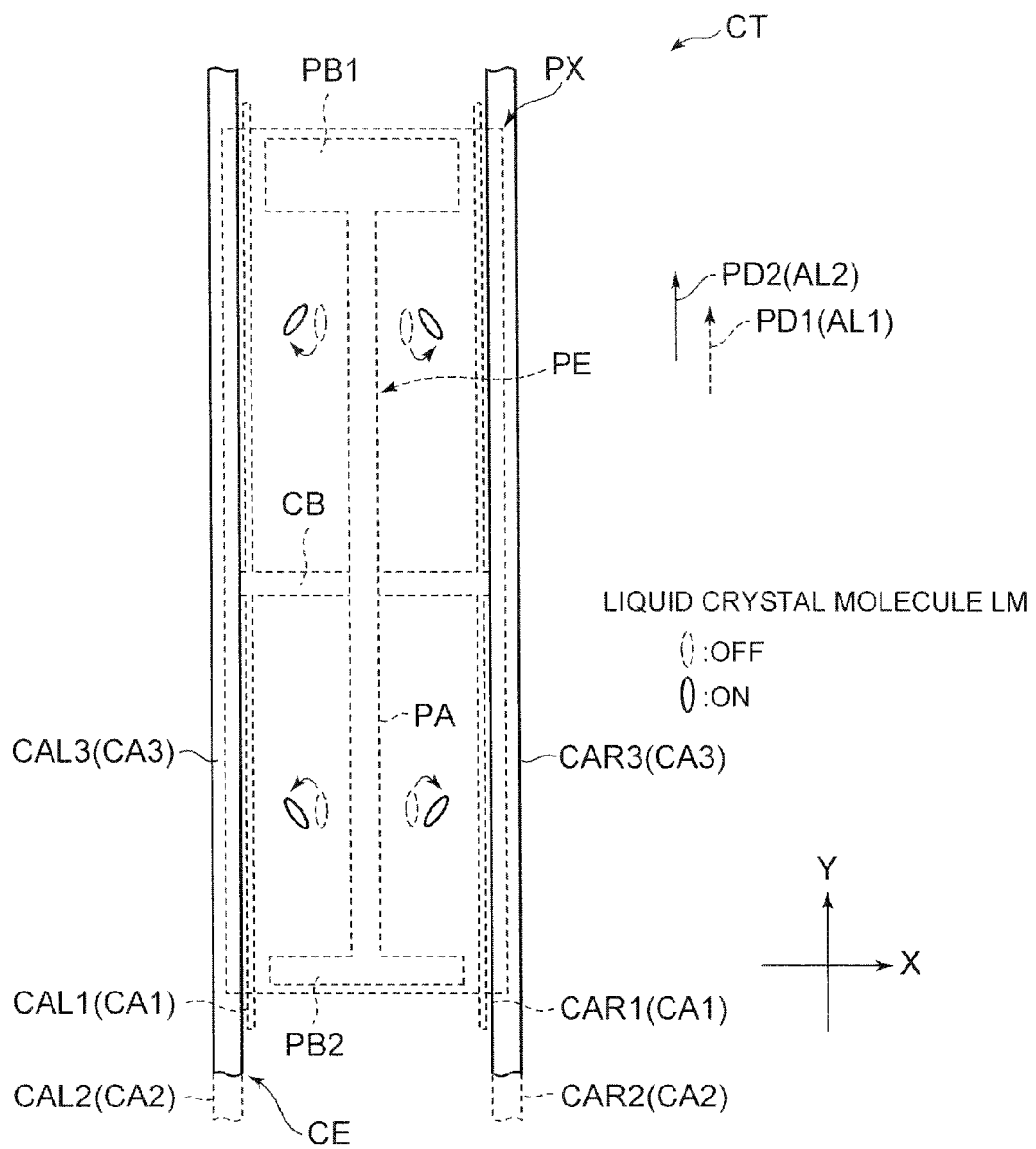
FIG. 4A is a plan view schematically showing a structure of one pixel PX in the counter substrate CT shown in FIG. 1.

FIG. 4A is a plan view schematically showing a structure of one pixel PX in the counter substrate CT shown in FIG. 1. Here, the plan view in a X-Y plane is shown. In addition, only composition required for explanation is illustrated, and the dashed line shows a portion of the pixel electrodes PE and the common electrodes CE which are the principal portions of the array substrate.

The counter substrate CT is equipped with a third main-common electrode CA3 which is a portion of the common electrodes CE. The third main-common electrode CA3 is electrically connected with the electric power supply portion VS on the outside of the active area in the array substrate, or electrically connected with the first main-common electrode CA1. Thereby, the third main-common electrode CA3 is set to substantially the same common potential as the first main-common electrode CA1, etc.

The third main-common electrode CA3 is located on the both sides sandwiching the pixel electrode PE in the X-Y plane, and linearly extends in the second direction Y. The third main-common electrode CA3 is located above the second main-common electrode CA2. The third main-common electrode CA3 is formed in a shape of belt with substantially the same width in the first direction X.

In this embodiment, the third main-common electrode CA3 is arranged in two parallel lines at intervals in the first direction X. The third main-common electrode CA3 includes a third main-common electrode CAL3 striding over a boundary between the illustrated pixel PX and a pixel adjoining in the left-hand side end of the illustrated pixel PX, and a third main-common electrode CAR3 striding over a boundary between the illustrated pixel PX and a pixel adjoining in the right-hand side end of the illustrated pixel PX. The third main-common electrode CAL3 counters with the second main-common electrode CRL2. The third main-common electrode CAR3 counters with the second main-common electrode CAR2.

In the counter substrate CT, the third main-common electrode CA3 is covered with a second alignment film AL2. In the second alignment film AL2, alignment treatment is made along with a second alignment treatment direction PD2 to make the liquid crystal molecule of the liquid crystal layer LQ initial alignment. Here, the alignment treatment is rubbing treatment, optical alignment treatment, etc., for example. The second alignment treatment direction PD2 is in parallel to the first alignment treatment direction PD1, and the same direction as the first alignment treatment direction PD1 in this embodiment. In addition, the first alignment treatment direction PD1 and the second alignment treatment direction PD2 may be opposite directions each other, or may be the opposite directions to the directions shown in the Figure while they are the same directions each other, i.e., the direction from the first sub-pixel electrode PB1 to the second sub-pixel electrode PB2.

Figure 5:
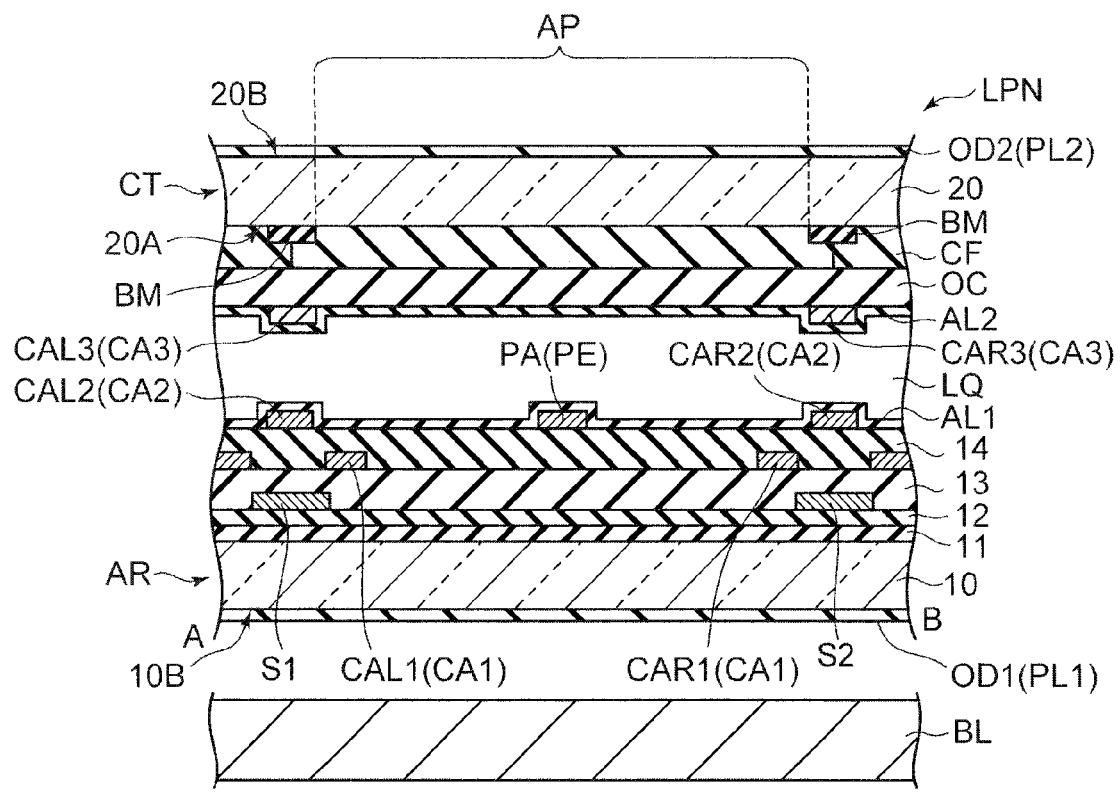
FIG. 5 is a cross-sectional view schematically showing the structure of the liquid crystal display panel LPN taken along line A-B shown in FIG. 2.
Figure 6:
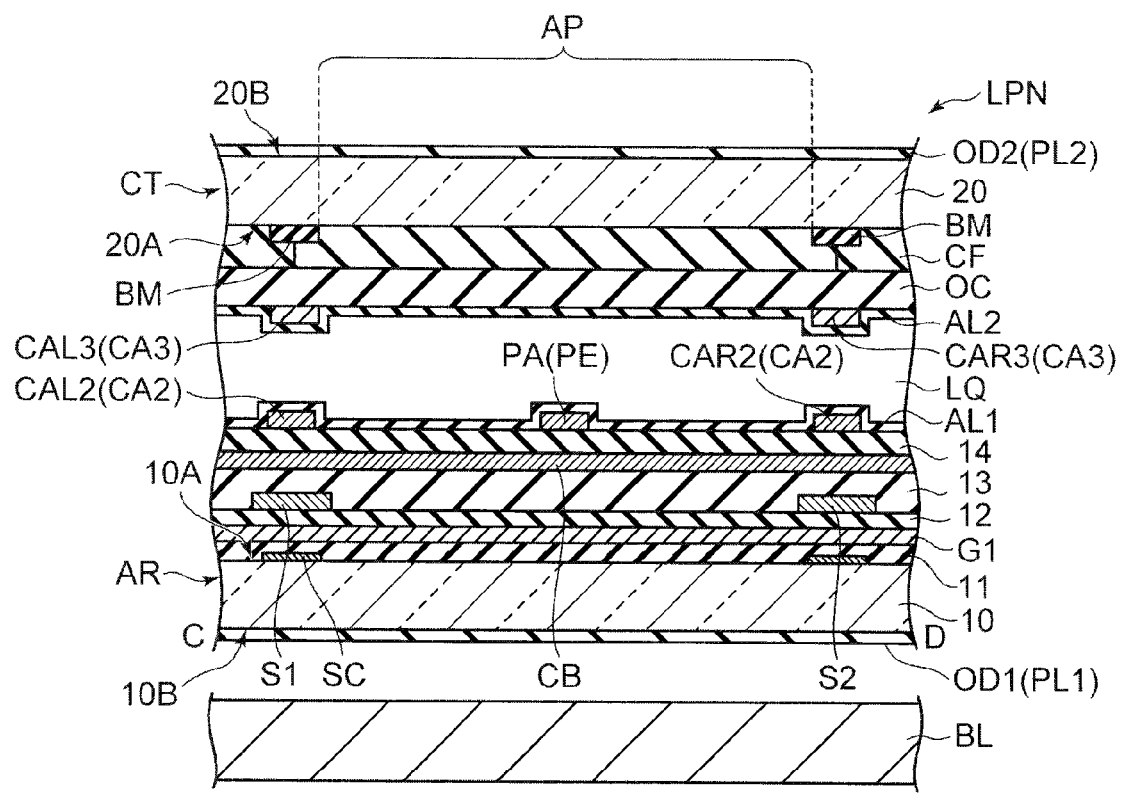
FIG. 6 is a cross-sectional view schematically showing the structure of the liquid crystal display panel LPN taken along line C-D shown in FIG. 2.
Figure 7:
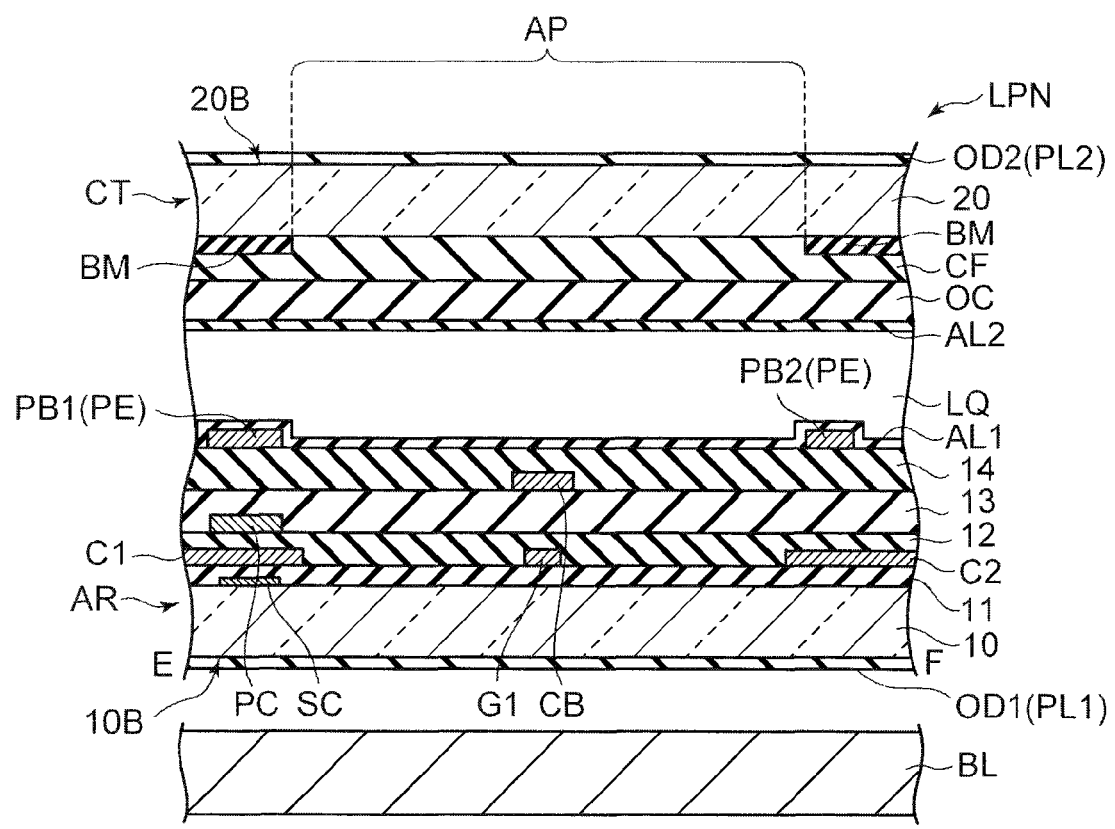
FIG. 7 is a cross-sectional view schematically showing the structure of the liquid crystal display panel LPN taken along line E-F shown in FIG. 2.

FIG. 5 is a cross-sectional view schematically showing the structure of the liquid crystal display panel LPN taken along line A-B shown in FIG. 2, FIG. 6 is a cross-sectional view schematically showing the structure of the liquid crystal display panel LPN taken along line C-D shown in FIG. 2. FIG. 7 is a cross-sectional view schematically showing the structure of the liquid crystal display panel LPN taken along line E-F shown in FIG. 2.

A backlight BL is arranged on the back side of the array substrate AR in the illustrated example. Various types of backlights BL can be used. For example, a light emitting diode (LED) or a cold cathode fluorescent lamp (CCFL), etc., can be applied as a light source of the backlight BL, and the explanation about its detailed structure is omitted.

The array substrate AR is formed using a first transparent insulating substrate 10. The array substrate AR, includes a semiconductor layer SC formed of poly-silicon of the switching element which is not explained in detail, the gate line G1, the auxiliary capacitance line C1, the auxiliary capacitance line C2, the source line S1, the source line S2, the pixel electrode PE, the first main-common electrode CA1, the second main-common electrode CA2, the first insulating film 11, the second insulating film 12, the third insulating film 13, the fourth insulating film 14, and the first alignment AL1, etc, in an inside surface of the first transparent insulating substrate 10 facing the counter substrate CT.

The semiconductor layer SC is formed between the first insulating substrate 10 and the first insulating film 11. The auxiliary capacitance line C1, the auxiliary capacitance line C2, and the gate line G1 are formed on the first insulating film 11, and covered with the second insulating film 12. The auxiliary capacitance lines C1, the auxiliary capacitance line C2, and the gate line G1 can be formed simultaneously by the same wiring material. The source line S1, the source line S2, and contact portion PC are formed on the second insulating film 12, and covered with the third insulating film 13. The source line S1, the source line S2, and contact portion PC can be formed simultaneously by the same wiring material. The third insulating film 13 corresponds to a first interlayer insulating film that covers the source line S1, the switching element, etc.

The first main-common electrode CA1 and the sub-common electrode CB are formed on the third insulating film 13, and covered with the fourth insulating film 14. The first main-common electrode CA1 and the sub-common electrode CB are formed of transparent electric conductive materials, such as Indium Tin Oxide (ITO) and Indium Zinc Oxide (IZO), for example.

The fourth insulating film 14 corresponds to a second interlayer insulating film that covers the first main-common electrode CA1 and the sub-common electrode CB. The fourth insulating film 14 is formed of a transparent resin material, for example. The fourth insulating film 14 eases level difference by the various wirings and electrodes which are located in the lower layer, and its surface is made approximately flat.

The main pixel electrode PA of the pixel electrode PE, the first sub-pixel electrode PB1, and the second sub-pixel electrode PB2 are formed on the fourth insulating film 14, and covered with first alignment film AL1. Moreover, the second main-common electrode CA2 is formed on the fourth insulating film 14 apart from the pixel electrode PE, and covered with the first alignment film AL1. The pixel electrode PE and the second main-common electrode CA2 can be formed simultaneously by the same material, and may be formed of transparent electric conductive materials, such as ITO and IZO, or other opaque wiring materials, such as aluminum (Al), titanium (Ti), silver (Ag), molybdenum (Mo), tungsten (W), copper (Cu), and chromium (Cr).

The first alignment film AL1 is arranged on the array substrate AR facing the counter substrate CT, and extends to whole active area ACT. The first alignment film AL1 is arranged also on the fourth insulating film 14. The first alignment film AL1 is formed of the material which shows a horizontal alignment characteristics.

The counter substrate CT is formed using a second insulating substrate 20 which has a transmissive characteristics. The counter substrate CT includes a black matrix BM, a color filter CF, an overcoat layer OC, the third main-common electrode CA3, and the second alignment film AL2, etc., in an internal surface of the second insulating substrate 20 facing the array substrate AR.

The black matrix BM defines each pixel PX, and forms an aperture AP facing the pixel electrode PE. That is, the black matrix BM is arranged so that wiring portions, i.e., the source line S, the auxiliary capacitance line C, and the switching element SW may counter the black matrix BM. Herein, the black matrix BM includes a portion located above the source lines S1 and S2 extending along the second direction Y, and a portion located above the gate lines G1 and G2 extending along the first direction X, and is formed in the shape of a lattice. The black matrix BM is formed in the internal surface 20A of the second insulating substrate 20 facing the array substrate AR.

The color filter CF is arranged corresponding to each pixel PX. That is, while the color filter CF is arranged in an aperture AP defined by the black matrix in the internal surface 20A of the second insulating substrate 20, a portion thereof extends on the black matrix BM. The colors of the color filters CF arranged in adjacent pixels PX in the first direction X differ mutually. For example, the color filters CF are formed of resin materials colored by three primary colors of red, blue, and green, respectively. The red color filter formed of resin material colored in red is arranged corresponding to the red pixel. The blue color filter formed of resin material colored in blue is arranged corresponding to the blue pixel. The green color filter formed of resin material colored in green is arranged corresponding to the green pixel. The boundary between the adjacent color filters CF is located in a position which overlaps with the black matrix BM. Furthermore, the color filter CF extends to a plurality of adjacent pixels in the second direction Y.

The overcoat layer OC covers the color filter CF. The overcoat layer OC eases influence of concave-convex of the surface of the color filter CF. The overcoat layer OC is formed of a transparent resin material, for example.

The third main-common electrode CA3 is formed on the overcoat layer OC facing the array substrate AR, and located under the black matrix BM. The second main-common electrode CAL2 is located under the third main-common electrode CAL3. The second main-common electrode CAR2 is located under the third main-common electrode CARS. In the above-mentioned aperture AP, the domain between the pixel electrode PE and the second and third main-common electrodes CA2 and CA3 correspond to a transmissive domain which penetrates the backlight.

The second alignment film AL2 is arranged on the counter substrate CT facing the array substrate AR, and extends to whole active area ACT. The second alignment film AL2 covers the third main-common electrode CA3, the overcoat layer OC, etc. The second alignment film AL2 is formed of the materials having horizontal alignment characteristics.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film. AL2 on the counter substrate CT. Thereby, a predetermined gap, for example, a 2-7 μm cell gap, is formed. The cell gap is smaller than the distance between the main pixel electrode PA and the first main common electrode CA1. The array substrate AR and the counter substrate CT are pasted together by seal material arranged in a peripheral of the active area, which is not illustrated, while the predetermined cell gap is formed, for example.

The liquid crystal layer LQ is held in a cell gap formed between the array substrate AR and the counter substrate CT, i.e., between the first alignment film AL1 and the second alignment film AL2. The liquid crystal layer LQ contains the liquid crystal molecules LM. For example, the liquid crystal layer LQ is formed of liquid crystal material whose dielectric anisotropy is positive (posi-type).

A first optical element OD1 is attached on an external surface 10B of the array substrate AR, i.e., the external surface of the first insulating substrate 10 which forms the array substrate AR by adhesives, etc. The first optical element OD1 is located on a side which counters with the backlight unit BL of the liquid crystal display panel LPN, and controls the polarization state of the incident light which enters into the liquid crystal display panel LPN from the backlight unit BL. The first optical element OD1 includes a first polarization plate PL1 having a first polarizing axis AX1. Other optical elements such as retardation film may be arranged between the first polarization plate PL1 and the first insulating substrate 10.

A second optical element OD2 is attached on an external surface 20B of the counter substrate CT, i.e., the external surface of the second insulating substrate 20 which forms the counter substrate CT by adhesives, etc. The second optical element OD2 is located on a display surface side of the liquid crystal display panel LPN, and controls the polarization state of emitted light from the liquid crystal display panel LPN. The second optical element OD2 includes a second polarization plate PL2 having a second polarizing axis AX2. Other optical elements such as retardation film may be arranged between the second polarization plate PL2 and the second insulating substrate 20.

Figure 4B:
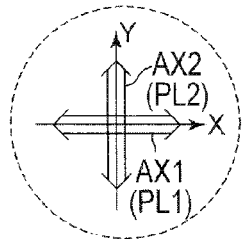
FIGS. 4B and 4C are figures showing alignment axes.
Figure 4C:
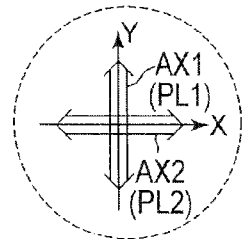

The first polarizing axis AX1 of the first polarization plate PL1 and the second polarizing axis AX2 of the second polarization plate PL2 are arranged in the Cross Nicol state in which they substantially intersects perpendicularly. At this time, one polarization plate is arranged so that its polarizing axis is arranged substantially in parallel with or in orthogonal with the extending direction of the main-pixel electrode PA or the initial alignment direction of the liquid crystal molecule. In FIG. 4B, the first polarization plate PL1 is arranged so that its first polarizing axis AX1 becomes in parallel to the first direction X. The second polarization plate PL2 is arranged so that its second polarizing axis AX2 becomes in parallel to the second direction Y. Furthermore, in FIG. 4C, the second polarization plate PL2 is arranged so that its second polarizing axis AX2 becomes in parallel to the first direction X. The first polarization plate PL1 is arranged so that its first polarizing axis AX1 becomes in parallel to the second direction Y.

Next, operation of the liquid crystal display panel LPN of the above-mentioned structure is explained.

At the time of non-electric field state (OFF), i.e., when a potential difference (i.e., electric field) is not formed between the pixel electrode PE and the common electrode CE, the liquid crystal molecules LM of the liquid crystal layer LQ are aligned so that their long axes are aligned in a parallel direction with the first alignment treatment direction PD1 of the first alignment film AL1 and the second alignment treatment direction PD2 of the second alignment film AL2 as shown with a dashed line in the figure. In this state, the time of OFF corresponds to the initial alignment state, and the alignment direction of the liquid crystal molecule LM corresponds to the initial alignment direction. Here, the first alignment treatment direction PD1 and the second alignment treatment direction PD2 are substantially in parallel with the second direction Y and same directions each other. At the time OFF, the liquid crystal molecules LM are initially aligned so that their long axes are aligned in parallel to the second direction Y in the X-Y plane as shown in the dashed line in the figure. That is, the initial alignment direction of the liquid crystal molecules is in parallel to the second direction Y.

At the time of OFF, a portion of the backlight from the backlight BL penetrates the first polarization plate PL1, and enters into the liquid crystal display panel LPN. The backlight which entered into the liquid crystal display panel LPN is linearly polarized light which intersects perpendicularly with the first polarizing axis AX1 of the first polarization plate PL1. The polarization state of the linearly polarized light does hardly change when the backlight passes the liquid crystal layer LQ at the time OFF. For this reason, the linearly polarized light which penetrates the liquid crystal display panel LPN is absorbed by the second polarization plate PL2 which is arranged in the Cross Nicol positional relationship with the first polarization plate PL1 (black display).

On the other hand, in case the potential difference (or electric field) is formed between the pixel electrode PE and the common electrode CE, i.e., at the time of ON, the lateral electric field (or oblique electric field) is formed in parallel with the substrates between the pixel electrode PE and the common electrode CE. The liquid crystal molecule LM is affected by the electric field between the pixel electrode PE and the common electrode CE, and the alignment state changes. That is, the long axes of the liquid crystal molecules rotate in the plane substantially in parallel to the X-Y plane. Thereby, transmissive regions where the backlight can penetrate are formed between the pixel electrode PE and the common electrode CE.

In the embodiment shown in FIG. 4A, in the region between the pixel electrode PE and the third main-common electrode CAL3 in the upper half region of the pixel PX, electric field is formed and inter acts between the main-pixel electrode PA and the first sub-pixel electrode PB1 and the second main-common electrode CAL2, and between the main-pixel electrode PA and the first sub-pixel electrode PB1 and the third main-common electrode CAL3, respectively. Accordingly, the liquid crystal molecule LM mainly rotates clockwise to the second direction Y, and turns to the lower left in the figure. Furthermore, in the lower half region of the pixel PX, the electric field is formed and interacts between the main-pixel electrode PA and the second sub-pixel electrode PB2 and the second main-common electrode CAL2, between the main-pixel electrode PA and the second sub-pixel electrode PB2 and the third main-common electrode CAL3, respectively. Accordingly, the liquid crystal molecule LM mainly rotates counterclockwise to the second direction Y, and turns to the upper left in the figure.

In the region between the pixel electrode PE and the third main-common electrode CARS in the upper half portion of the pixel PX, electric field is formed and interacts between the main-pixel electrode PA and the first sub-pixel electrode PB1 and the second main-common electrode CAR2, and between the main-pixel electrode PA and the first sub-pixel electrode PB1 and the third main-common electrode CARS, respectively. Accordingly, the liquid crystal molecule LM mainly rotates counterclockwise to the second direction Y, and turns to the lower light in the figure. Furthermore, in the lower half portion of the pixel PX, the electric field is formed between the main-pixel electrode PA and the second sub-pixel electrode PB2 and the second main-common electrode CAR2, and between the main-pixel electrode PA and the second sub-pixel electrode PB2 and the third main-common electrode CARS, respectively. Accordingly, the liquid crystal molecule LM mainly rotates clockwise to the second direction Y, and turns to the upper right in the figure.

Thus, in each pixel, at the time when the electric field is formed between the pixel electrode PE and the common electrode CE, the alignment direction of the liquid crystal molecule is divided into a plurality of directions with respect to the region in which the pixel electrode PE and the sub-common electrode CB overlap each other, and domains are formed corresponding to each direction. That is, a plurality of domains is formed in each pixel.

At the time of ON, the linearly polarized light which intersects perpendicularly with the first polarizing axis AX1 of the first polarization plate PL1 enters into the liquid crystal display panel LPN, and the polarization state changes when passing the liquid crystal layer LQ in accordance with the alignment state of the liquid crystal molecule LM. For this reason, at the time of ON, at least a portion of the backlight which passed the liquid crystal layer LQ penetrates the second polarization plate PL2 (white display).

Moreover, according to this embodiment, since the first sub-common electrode CB is arranged so as to overlap with the gate line G, undesirable leaked electric field from the gate line G can be shielded. The first sub-common electrode CB functions as a gate shield electrode. Therefore, the influence of undesirable electric field in the region close to the gate line G in the transmissive region is eased, and it becomes possible to control degradation of display grace.

Moreover, according to this embodiment, the array substrate AR includes two layers of main-common electrodes (the first main-common electrode CA1 and the second main-common electrode CA2) facing the liquid crystal layer LQ in the circumference of each source line S, to which the same potential, i.e., the common potential is applied. The first main-common electrode CA1 is located in a lower layer adjacent to the source line S. The second main-common electrode CA2 in the upper layer is located right above the source line 52. Since the first main-common electrode CA1 and the second main-common electrode CA2 are set to the same potential, an equipotential surface is formed therebetween. The equipotential surface shields undesirable leaked electric field which directs to the liquid crystal layer LQ from the source line S arranged in the lower layer. That is, the first main-common electrode CA1 and the second main-common electrode CA2 can shield undesirable leaked electric field from the source line 5, and can function as a source shield electrode. At this time, the first main-common electrode CA1 corresponds to the first electric conductive layer of the source shield electrodes, and the second main-common electrode CA2 corresponds to the second electric conductive layer of the source shield electrodes. Thus, the influence of the leaked electric field from the source line S which adjoins the pixel electrode PE can be eased, and it becomes possible to control degradation of the display grace by a cross talk.

Moreover, while horizontal electric field (or oblique electric field) required to control the alignment of the liquid crystal molecule between the main pixel electrode PA and the second main-common electrode CA2, and between the main pixel electrode PA and the third main-common electrode CA3 is formed at the time of ON according to this embodiment, fringe electric field is formed between the main pixel electrode PA and the sub-common electrode CB. In the X-Y plane, the fringe electric field is substantially in parallel to the above horizontal electric field. For this reason, it becomes possible to control alignment disorder of the liquid crystal molecule LM near the gate line G, i.e., in the circumference of the sub-common electrode CB. Thereby, it becomes possible to improve transmissivity near the gate line G, and also to improve the transmissivity in each pixel.

When the fringe electric field acts on the liquid crystal molecule, the alignment of the liquid crystal molecule is disordered, and it may become impossible to obtain desired transmissivity in the example explained here. It becomes possible to reduce the influence by the fringe electric field to the liquid crystal layer by making large the thickness of the fourth insulating film 14 formed of a transparent resin material. For example, it is desirable to form the film thickness of the fourth insulating film 14 with approximately 1 μm, when forming the fourth insulating film 14 with the resin material. Accordingly, it becomes possible to raise manufacturing yield than the case where the fourth insulating film 14 is formed of the transparent non-organic materials.

Moreover, according to this embodiment, although the first main-common electrode CA1 is located in the region facing the aperture AP, the first main-common electrode CA1 is formed of a transparent electric conductive material. AT the time of ON, the liquid crystal molecule LM located right above the first main-common electrode CA1 is alignment controlled between the pixel electrode PE and the second main-common electrode CA2 and between the pixel electrode PE and the third main-common electrode CA3. Accordingly, the liquid crystal molecule LM above the first main-common electrode CA1 also contributes the display. That is, according to this embodiment, while the first main-common electrode CA1 is arranged in the aperture AP, the fall of the transmissivity in the aperture AP is not resulted and high transmissivity is achieved.

Moreover, according to this embodiment, at the time of ON, the liquid crystal molecule LM in the region which overlaps with the main pixel electrode PA, the second main-common electrode CA2 and the third main-common electrode CA3 maintains the same initial alignment state as the time of OFF (or the time of a black display), and does not contribute to the display. For this reason, in case electrode width of the second main-common electrode CA2 and the third main-common electrode CA3 are formed so as to be larger than the line width of the source line 5, the region which overlaps with an electrode portion which runs off from the source line S does not contribute to the display. On the other hand, according to this embodiment, since the electrode width of the second main-common electrode CA2 and the third main-common electrode CA3 is smaller than the line width of source line S, it becomes possible to expand the region in which the alignment of the liquid crystal molecule LM can be controlled.

Moreover, according to this embodiment, the first main-common electrode CA1 near the source line S is arranged in the position which is shifted from the region above the source line S. For this reason, it becomes possible to control formation of the undesirable capacitance between the source line S and the first main-common electrode CA1, and also to reduce the power consumption of the liquid crystal display device. Moreover, the second main-common electrode CA2 facing the source line S is located more apart from the source line S rather than first main-common electrode CA1 and having line width smaller than the source line S, it becomes possible to reduce the influence to the display by the capacitance formed therebetween.

Moreover, according to this embodiment, the liquid crystal molecule LM in the region which overlaps with the second main-common electrode CA2 located right above source line S or the region which overlaps with the third main-common electrode CA3 located under the black matrix BM maintains the initial alignments state even at the time of ON. For this reason, even if assembling shift between the array substrate AR and the counter substrate CT arises, the leak of undesirable electric field to the adjoining pixel can be controlled. Therefore, even if it is a case where the colors of color filter CF differ between the adjoining pixels, it becomes possible to control generating of mixed colors. Moreover, even if it is a case where a liquid crystal display panel is observed from an oblique direction, since the backlight does not penetrate the region which overlaps with the second main-common electrode CA2 or the third main-common electrode CA3, it becomes possible to control generating of mixed colors.

Moreover, according to this embodiment, it becomes possible to form a plurality of domains in one pixel. For this reason, a viewing angle can be optically compensated in the plurality of directions, and wide viewing angle can be attained.

According to this embodiment, in the common electrode CE, the first main-common electrode CA1 and the sub-common electrode CB are electrically connected mutually, the second main-common electrode CA2 is electrically connected with the first main-common electrode CA1, and the third main common electrode CA3 is electrically connected with the first main common electrode CA1, etc. For this reason, even if disconnection occurs in the common electrodes CE, it becomes possible to supply common potential stably, and to control the generation of a poor display.

In addition, although the above-mentioned example explains the case where the initial alignment direction of the liquid crystal molecule LM is in parallel to the second direction Y, the initial alignment direction of the liquid crystal molecule LM may be the oblique direction which obliquely crosses the second direction Y.

Moreover, in this embodiment, although the case where the liquid crystal layer LQ is formed of the liquid crystal material which has positive (positive type) dielectric constant anisotropy, the liquid crystal layer LQ may be formed of the liquid crystal material which has negative (negative type) dielectric constant anisotropy.

As explained above, according to the embodiments, it becomes possible to supply the liquid crystal display device which can control degradation of display grace.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:

1. A liquid crystal display device, comprising:
   a first substrate including;
      a gate line extending in a first direction,
      a source line extending in a second direction orthogonally crossing the first direction,
      a switching element electrically connected with the gate line and the source line,
      a first interlayer insulating film covering the switching element,
      a sub-common electrode formed on the first interlayer insulating film and extending in the first direction, the sub-common electrode facing the gate line,
      a first main-common electrode formed on the first interlayer insulating film and connected with the sub-common electrode, the first main-common electrode extending along the source line in the second direction,
      a second interlayer insulating film covering the sub-common electrode and the first main-common electrode,
      a second main-common electrode formed on the second interlayer insulating film and extending in the second direction so as to face the source line, the second main-common electrode set to the same potential as the first main-common electrode,
      a main-pixel electrode formed on the second interlayer insulating film and extending in the second direction so as to cross the sub-common electrode, the main-pixel electrode electrically connected with the switching element, and
      a first alignment film covering the second main-common electrode and the main-pixel electrode;
   a second substrate including;
      a third main-common electrode extending in the second direction so as to face the second main-common electrode, the third main-common electrode set to the same potential as the second main-common electrode, and
      a second alignment film covering the third main-common electrode,
   a liquid crystal layer held between the first substrate and the second substrate.

2. The liquid crystal display device according to claim 1, wherein
   the first substrate further includes a first auxiliary capacitance line and a second auxiliary capacitance line extending in the first direction, respectively, and
   the gate line is arranged in a central portion between the first auxiliary capacitance line and the second auxiliary capacitance line.

3. The liquid crystal display device according to claim 2, wherein
   the first substrate further includes a first sub-pixel electrode connected with one end of the main-pixel electrode so as to locate on the first auxiliary capacitance line and extending in the first direction, and
   a second sub-pixel electrode connected with the other end of the main-pixel electrode so as to locate on the second auxiliary capacitance line and extending in the first direction.

4. The liquid crystal display device according to claim 3, wherein
   the first substrate further includes a contact portion located on the first auxiliary capacitance line and electrically connected with the switching element, and
   the first sub-pixel electrode contacts with the contact portion.

5. The liquid crystal display device according to claim 3, wherein
   the width of the first sub-pixel electrode is larger than the width of the second sub-pixel electrode.

6. The liquid crystal display device according to claim 1, wherein
   the first main-common electrode is formed of a transparent conductive material, and arranged on the main-pixel electrode side rather than a region overlapping with the source line, and
   the width of the second main-common electrode is smaller than the width of the source line, and arranged in a region overlapping with the source line.

7. The liquid crystal display device according to claim 1, wherein the first main-common electrode and the sub-common electrode are formed of transparent conductive materials, such as Indium Tin Oxide (ITO) and Indium Zinc Oxide (IZO).

8. The liquid crystal display device according to claim 1, wherein
   a first optical element including a first polarization plate having a first polarizing axis is attached on an external surface of the first substrate, and
   a second optical element including a second polarization plate having a second polarizing axis is attached on an external surface of the second substrate.

9. The liquid crystal display device according to claim 8, wherein
   the first polarizing axis and the second polarizing axis are arranged in the Cross Nicol state in which they substantially intersect orthogonally, and
   one of the first and second polarization axes is arranged substantially in parallel with or in orthogonal with an extending direction of the main-pixel electrode.

10. A liquid crystal display device, comprising:
    a first substrate including;
       a gate line extending in a first direction,
       a source line extending in a second direction orthogonally crossing the first direction,
       a switching element electrically connected with the gate line and the source line,
       a gate shield electrode extending in the first direction and facing the gate line,
       a source shield electrode extending in the second direction so as to face the source line, the source shield electrode set to the same potential as the gate shield electrode, and
       a main pixel electrode extending in the second direction so as to cross the gate shield electrode, the main pixel electrode being apart from the source shield electrode and electrically connected with the switching element,
    a second substrate including a main-common electrode facing the source shield electrode and extending in the second direction, the main-common electrode set to the same potential as the source shield electrode; and
    a liquid crystal layer held between the first substrate and the second substrate.

11. The liquid crystal display device according to claim 10, wherein the source shield electrode is formed of a first conductive layer extending along the source line and a second conductive layer arranged opposing the source line.

* * * * *